United States Patent
Park

(10) Patent No.: US 11,740,352 B2
(45) Date of Patent: Aug. 29, 2023

(54) OBSTACLE RECOGNITION DEVICE, VEHICLE SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventor: Kyu Jin Park, Namyangju-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 243 days.

(21) Appl. No.: 17/080,002

(22) Filed: Oct. 26, 2020

(65) Prior Publication Data

US 2021/0341603 A1 Nov. 4, 2021

(30) Foreign Application Priority Data

May 4, 2020 (KR) .................. 10-2020-0053411

(51) Int. Cl.
*G01S 15/00* (2020.01)
*G01S 15/931* (2020.01)
(Continued)

(52) U.S. Cl.
CPC .......... *G01S 15/931* (2013.01); *B60W 30/09* (2013.01); *B60W 30/0956* (2013.01); *B60W 40/105* (2013.01); *B60W 40/13* (2013.01); *B60W 50/06* (2013.01); *G05D 1/0221* (2013.01); *G05D 1/0223* (2013.01); *G06N 3/04* (2013.01); *G06N 3/08* (2013.01); *B60W 2040/1315* (2013.01); *B60W 2420/54* (2013.01);
(Continued)

(58) Field of Classification Search
CPC . G01S 15/931; B60W 30/09; B60W 30/0956; B60W 40/105; B60W 40/13; B60W 50/06; B60W 2554/801; B60W 2040/1315; B60W 2420/54; G05D 1/0221; G05D 1/0223; G06N 3/04; G06N 3/08

See application file for complete search history.

(56) References Cited

U.S. PATENT DOCUMENTS 10,394,234 B2 * 8/2019 Salour .................. G05D 1/0033
11,079,764 B2 * 8/2021 Nister .................. G05D 1/0214
(Continued)

FOREIGN PATENT DOCUMENTS

DE 102017101476 B3 * 3/2018 ............. G01S 15/93

OTHER PUBLICATIONS

Shao, Y., "A Grid Projection Method Based on Ultrasonic Sensor for Parking Space Detection", 2018, IEEE (Year: 2018).*

*Primary Examiner* — Elaine Gort
*Assistant Examiner* — Brittany Renee Peko
(74) *Attorney, Agent, or Firm* — MORGAN, LEWIS & BOCKIUS LLP

(57) ABSTRACT

An obstacle recognition device, a vehicle system including the same, and a method thereof are provided. The obstacle recognition device includes a storage storing data and an algorithm for calculating a risk probability and a processor configured to execute the algorithm to generate an occupancy grid map based on a sensing value of at least one ultrasonic sensor, calculate the risk probability of each cell on the occupancy grid map, and determine a shape and location of an obstacle based on the risk probability of each cell.

17 Claims, 11 Drawing Sheets

(51) Int. Cl.

| | |
|---|---|
| *G05D 1/02* | (2020.01) |
| *B60W 30/095* | (2012.01) |
| *B60W 40/13* | (2012.01) |
| *B60W 50/06* | (2006.01) |
| *B60W 30/09* | (2012.01) |
| *B60W 40/105* | (2012.01) |
| *G06N 3/04* | (2023.01) |
| *G06N 3/08* | (2023.01) |

(52) U.S. Cl.
CPC ... *B60W 2520/10* (2013.01); *B60W 2554/801* (2020.02); *G05D 2201/0213* (2013.01)

(56) References Cited

U.S. PATENT DOCUMENTS

| | | |
|---|---|---|
| 2016/0016560 A1 | 1/2016 | Parker et al. |
| 2017/0274876 A1 | 9/2017 | Kim et al. |
| 2018/0057017 A1* | 3/2018 | Procuniar ........... B60W 50/085 |
| 2018/0203445 A1* | 7/2018 | Micks .................. G05D 1/0088 |
| 2020/0062228 A1* | 2/2020 | Nakabayashi ........ B60T 8/1764 |
| 2020/0200547 A1* | 6/2020 | Miller ..................... G01C 21/32 |
| 2022/0126864 A1* | 4/2022 | Moustafa .......... B60W 60/0013 |
| 2022/0397665 A1* | 12/2022 | Matthies ............... G01S 15/876 |

\* cited by examiner

OBSTACLE RECOGNITION DEVICE, VEHICLE SYSTEM INCLUDING THE SAME, AND METHOD THEREOF

CROSS-REFERENCE TO RELATED APPLICATION

This application claims the benefit of priority to Korean Patent Application No. 10-2020-0053411, filed in the Korean Intellectual Property Office on May 4, 2020, the entire contents of which are incorporated herein by reference.

TECHNICAL FIELD

The present disclosure relates to an obstacle recognition device, a vehicle system including the same, and a method thereof, and more particularly, relates to technologies of more accurately estimating a shape and location of an obstacle based on an ultrasonic sensor.

BACKGROUND

An existing technology measures a location and shape of an obstacle using multiple sensing information of an ultrasonic sensor, a camera, and a radar to determine a risk of collision with an obstacle around a host vehicle and perform warning and braking control.

Particularly, a conventional ultrasonic sensor has an uppermost limit to accurately estimate a contour for a width and height of an obstacle.

FIG. 1 is a drawing an uppermost limit when an obstacle is sensed by a conventional ultrasonic sensor.

Referring to reference numerals 11 and 12 of FIG. 1, although a vehicle 10 to be measured is changed in location while the vehicle 10 is traveling, distance information obtained via an ultrasonic sensor may be the same. Thus, when an obstacle is recognized on the basis of a side ultrasonic sensor, like reference numeral 13, there may occur a phenomenon where the obstacle is expanded and indicated to have a long contour.

Furthermore, as an obstacle such as a curb is not distinguished like reference numeral 13 of FIG. 1, it is possible to incorrectly brake in front of the curb.

SUMMARY

The present disclosure has been made to solve the above-mentioned problems occurring in the prior art while advantages achieved by the prior art are maintained intact.

An aspect of the present disclosure provides an obstacle recognition device for accurately estimating a shape of an obstacle based on a learning algorithm using a direct wave, an indirect wave, and a signal strength value among output values of an ultrasonic sensor during low-speed driving control or parking control of the vehicle to improve accuracy of collision-avoidance assist control and minimize incorrect braking, a vehicle system including the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an obstacle recognition device may include a storage storing data and an algorithm for calculating a risk probability and a processor configured to execute the algorithm to generate an occupancy grid map based on a sensing value of at least one ultrasonic sensor, calculate the risk probability of each cell on the occupancy grid map, and determine a shape and location of an obstacle based on the risk probability of each cell.

In an embodiment, the processor may obtain sequential direct and indirect waves and a signal strength from the at least one ultrasonic sensor.

In an embodiment, the processor may calculate the risk probability of each cell on the occupancy grid map by using the direct wave, the indirect wave, and the signal strength of the at least one ultrasonic sensor, a behavior of a host vehicle, and a distance and an angle from a center of gravity of the host vehicle to each cell on the occupancy grid map as input values of a learning algorithm.

In an embodiment, the processor may perform the learning algorithm using a recurrent neural network (RNN) learning model.

In an embodiment, the processor may update the risk probability of each cell using a Bayesian rule.

In an embodiment, the processor may convert the risk probability of each cell, calculated by the Bayesian rule, in log notation.

In an embodiment, the processor may compare the risk probability of each cell, converted in the log notation, with a predetermined threshold value.

In an embodiment, the processor may determine that an obstacle is present on a corresponding cell when the risk probability of each cell is greater than or equal to the predetermined threshold value and updates the occupancy grid map.

In an embodiment, the processor may determine that an obstacle located on a corresponding cell is an obstacle it is possible for a host vehicle to pass, when a risk probability of the at least one cell on the occupancy grid map is greater than or equal to the threshold value.

In an embodiment, the processor may determine a break regulation time by calculating a time to collision based on the risk probability of each cell on the occupancy grid map and a speed of a host vehicle.

In an embodiment, the processor may determine a braking control time proportional to the risk probability of each cell on the occupancy grid map or a speed of a host vehicle.

According to another aspect of the present disclosure, a vehicle system may include a sensing device including at least one ultrasonic sensor and an obstacle recognition device that generates an occupancy grid map based on a sensing value of the at least one ultrasonic sensor, calculates a risk probability of each cell on the occupancy grid map, and determines a shape and location of an obstacle based on the risk probability of each cell.

In an embodiment, the obstacle recognition device may determine a break regulation time by calculating a time to collision based on the risk probability of each cell on the occupancy grid map and a speed of a host vehicle.

In an embodiment, the vehicle system may further include a braking controller that performs braking control depending to the braking control time.

According to another aspect of the present disclosure, an obstacle recognition method may include generating an occupancy grid map based on a sensing value of at least one ultrasonic sensor, calculating a risk probability of each cell on the occupancy grid map, and determining a shape and location of an obstacle based on the risk probability of each cell.

In an embodiment, the calculating of the risk probability of each cell may include calculating the risk probability of each cell on the occupancy grid map by using a direct wave, an indirect wave, and a signal strength of the at least one ultrasonic sensor, a behavior of a host vehicle, and a distance and an angle from a center of gravity of the host vehicle to each cell on the occupancy grid map as input values of a learning algorithm.

In an embodiment, the calculating of the risk probability of each cell may include updating the risk probability of each cell by calculating the risk probability of each cell using a Bayesian rule.

In an embodiment, the obstacle recognition method may further include determining whether there is the obstacle by comparing the risk probability of each cell on the occupancy grid map with a predetermined threshold value.

In an embodiment, the obstacle recognition method may further include determining that the obstacle is present on a corresponding cell when the probability of each cell is greater than or equal to the predetermined threshold value.

In an embodiment, the obstacle recognition method may further include determining that an obstacle located on a corresponding cell is an obstacle for a host vehicle to pass, when a risk probability of the at least one cell on the occupancy grid map is greater than or equal to the threshold value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
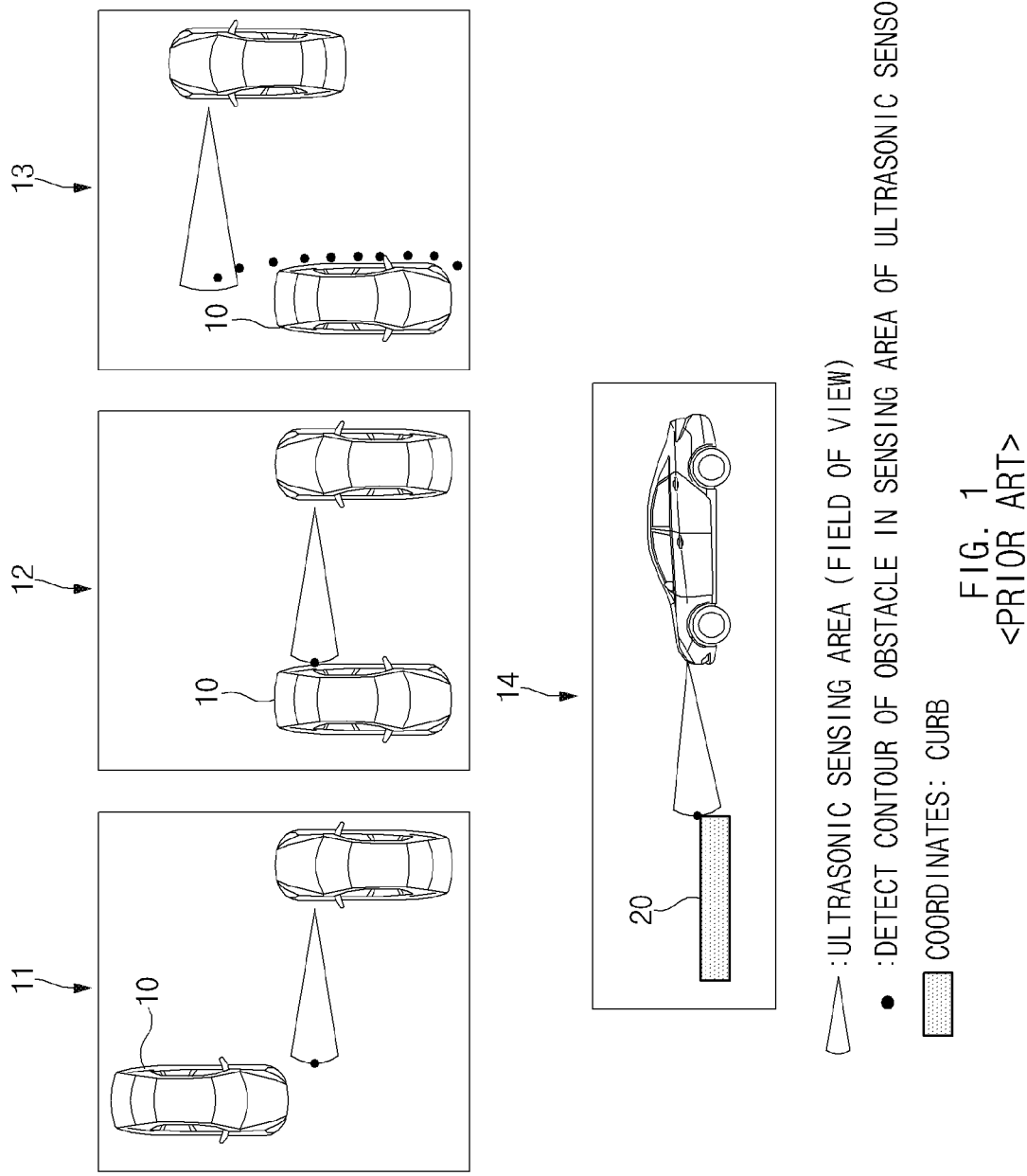
FIG. 1 is a drawing an uppermost limit when an obstacle is sensed by a conventional ultrasonic sensor.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An embodiment of the present disclosure discloses a configuration capable of measuring a shape and location of an obstacle using an ultrasonic sensor previously mounted on the vehicle and solving the uppermost limit of the ultrasonic sensor by applying an ultrasonic sensor value to a recurrent neural network (RNN) learning model, thus more accurately estimating the shape and location of the obstacle.

Hereinafter, embodiments of the present disclosure will be described in detail with reference to FIGS. 2 to 11.

Figure 2:
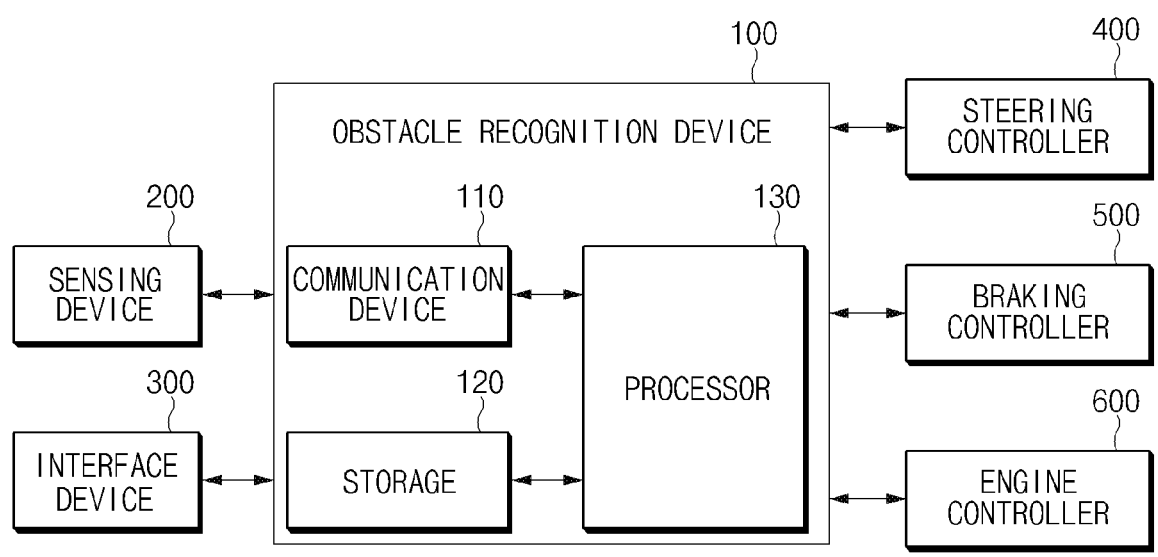
FIG. 2 is a block diagram illustrating a configuration of a vehicle system including an obstacle recognition device according to an embodiment of the present disclosure.
Figure 3:
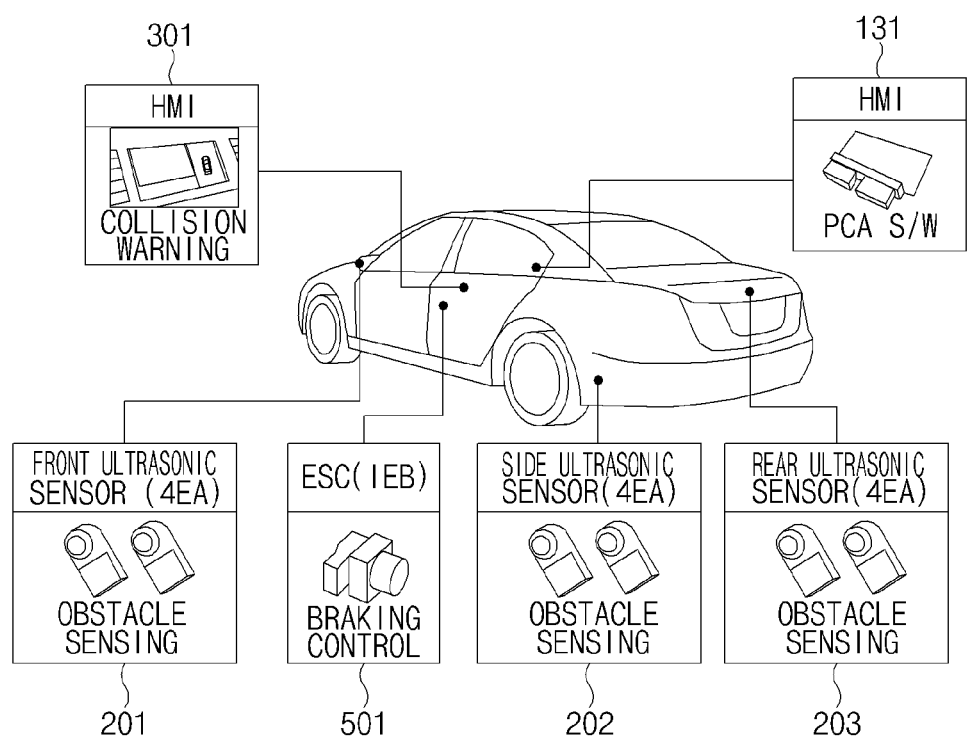
FIG. 3 is a drawing illustrating an exemplary screen of a configuration of an obstacle recognition device according to an embodiment of the present disclosure.

FIG. 2 is a block diagram illustrating a configuration of a vehicle system including an obstacle recognition device according to an embodiment of the present disclosure. FIG. 3 is a drawing illustrating an exemplary screen of a configuration of an obstacle recognition device according to an embodiment of the present disclosure.

Referring to FIG. 2, the vehicle system according to an embodiment of the present disclosure may include an obstacle recognition device 100, a sensing device 200, an interface 300, a steering controller 400, a braking controller 500, and an engine controller 600.

The obstacle recognition device 100 may be implemented in a host vehicle. In this case, the obstacle recognition device 100 may be integrally configured with control units in the host vehicle or may be implemented as a separate device to be connected with the control units of the host vehicle by a separate connection means. The obstacle recognition device 100 may be implemented as a parking collision-avoidance assist (PCA) device which determines a risk of collision with a surrounding obstacle when the host vehicle is traveling at a low speed and performs warning or braking control.

The obstacle recognition device 100 may generate an occupancy grid map based on a sensing value of at least one ultrasonic sensor and may calculate a risk probability of each cell on the occupancy grid map. Furthermore, the obstacle recognition device 100 may accurately determine a shape and location of an obstacle based on the risk probability of each cell. Furthermore, the obstacle recognition device 100 may distinguish an obstacle, such as a curb, which it is possible for the host vehicle to pass, because the obstacle has a low height from an obstacle, which it is impossible for the host vehicle to pass, based on the risk probability. Thus, the host vehicle passes the obstacle, such as the curb, which it is possible for the host vehicle to pass, without braking.

To this end, as shown in FIG. 2, the obstacle recognition device 100 may include a communication device 110, a storage 120, and a processor 130.

The communication device 110 may be a hardware device implemented with various electronic circuits to transmit and receive a signal through a wireless or wired connection. In an embodiment of the present disclosure, the communication device 110 may perform a network communication technology in the vehicle and may perform vehicle-to-infrastructure (V2I) communication with a server, an infrastructure, or another vehicle outside the vehicle using wireless Internet technology or short range communication technology. Herein, the network communication technology in the vehicle may be to perform inter-vehicle communication through controller area network (CAN) communication, local interconnect network (LIN) communication, flex-ray communication, or the like. Furthermore, the wireless Internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

As an example, the communication device 110 may communicate with a parking lot server or the like and may receive information about a space available for parking in a parking lot.

The storage 120 may store the sensing result of the sensing device 200, the information about the space available for parking, which is received by the communication device 110, data obtained by the processor 130, data and/or an algorithm necessary for an operation of the obstacle recognition device 100, or the like.

As an example, the storage 120 may store sensing values, such as obstacle information, which are detected by ultrasonic sensors, and may store information such as the result of analyzing a direct wave and an indirect wave of the ultrasonic sensor and a signal strength, which are determined by the processor 130.

Furthermore, the storage 120 may store a learning algorithm causing the processor 130 to estimate a shape and location of an obstacle and may store a command, an algorithm, and/or the like for determining a braking time.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The processor 130 may be electrically connected with the communication device 110, the storage 120, or the like and may electrically control the respective components. The processor 130 may be an electrical circuit which executes instructions of software and may perform a variety of data processing and calculation described below. The processor 130 may be, for example, an electronic control unit (ECU), a micro controller unit (MCU), or another sub-controller, which is loaded into the vehicle.

Figure 4:
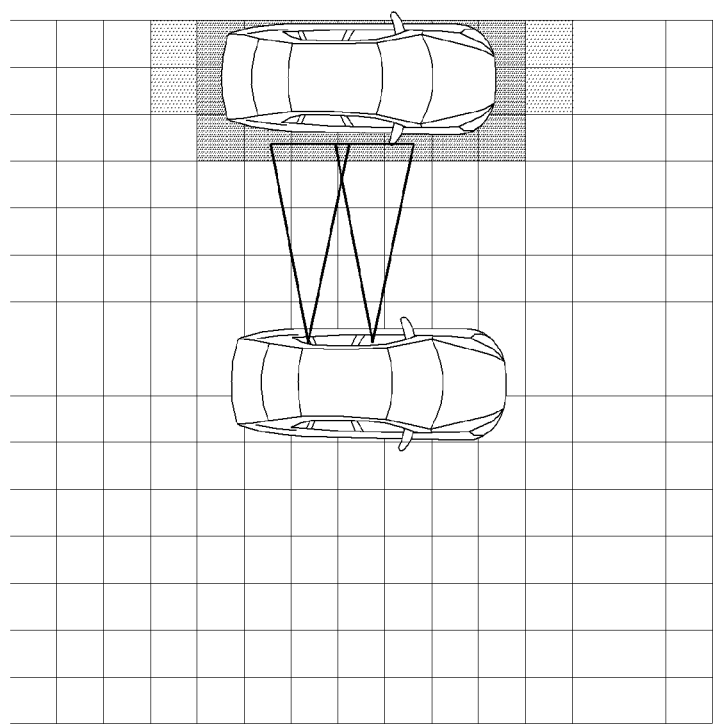
FIG. 4 is a drawing illustrating an exemplary screen of an occupancy grid map according to an embodiment of the present disclosure.

The processor 130 may generate an occupancy grid map based on a sensing value of the ultrasonic sensor. In this case, the occupancy grid map may be a map, data of which is displayed in the form of a grid. As shown in FIG. 4, the ground is shown in the form of a grid, and a square space generated while a horizontal line and a vertical line intersect is defined as a "cell". Such a map in the form of a grid may be composed of a plurality of cells. In an embodiment of the present disclosure, the occupancy grid map may be generated based on map information and a sensing value of the ultrasonic sensor and may be generated using various general methods which are not disclosed in various embodiments of the present disclosure. Furthermore, in the occupancy grid map, a risk probability value corresponding to each of the plurality of cells may be calculated and mapped.

Thus, the processor 130 may calculate a risk probability of each cell on the occupancy grid map using a recurrent neural network (RNN) learning model.

In other words, the processor 130 may calculate the risk probability of each cell on the occupancy grid map by using sequential direct and indirect waves and a signal strength, which are obtained from at least one ultrasonic sensor, a behavior of the host vehicle, which is obtained from a wheel speed sensor and a steering sensor, and a distance and an angle from the center of gravity of the host vehicle to each cell on the occupancy grid map as input values of the RNN learning model.

In this case, the RNN learning model may be a deep learning model for learning data, such as time-series data, changed over time, and the RNN may be an artificial neural network (ANN) established by connecting a network at reference time t and next time t+1.

Figure 5:
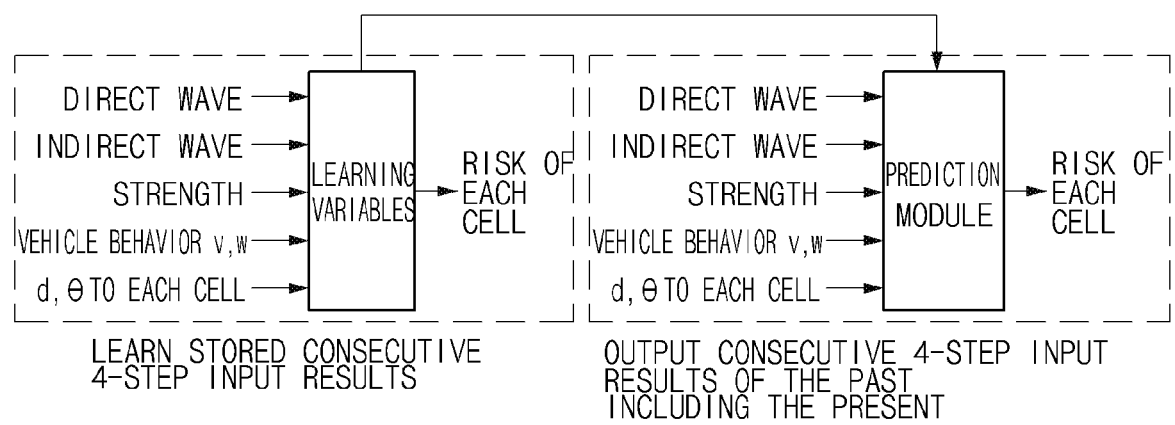
FIG. 5 is a drawing illustrating a method for calculating a cell risk using a recurrent neural network (RNN) learning model according to an embodiment of the present disclosure.
Figure 6:
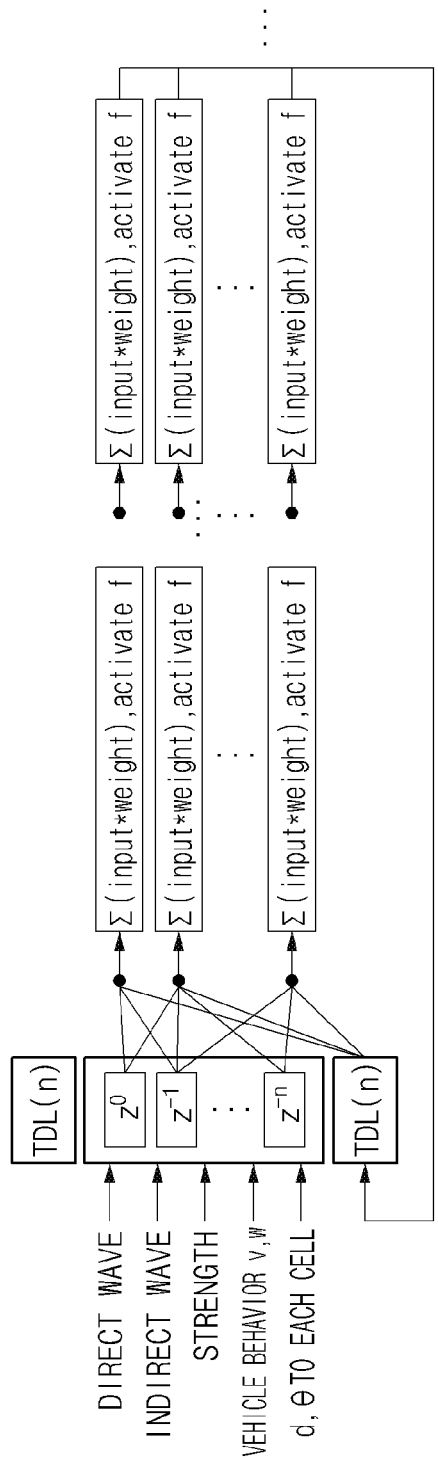
FIG. 6 is a drawing illustrating a detailed RNN learning model according to an embodiment of the present disclosure.

FIG. 4 is a drawing illustrating an exemplary screen of an occupancy grid map according to an embodiment of the present disclosure. FIG. 5 is a drawing illustrating a method for calculating a cell risk using a recurrent neural network (RNN) learning model according to an embodiment of the present disclosure.

When sequential direct and indirect waves and a signal strength, which are obtained from at least one ultrasonic sensor, a behavior (e.g., a speed v, or steering w) of a host vehicle, which is obtained from a wheel speed sensor and a steering sensor, and a distance d and an angle θ from the center of gravity of the host vehicle to each cell on the occupancy grid map are input to a learning variable model, a risk of each cell may be calculated. In this case, the learning variable model may learn consecutive input values of four front ultrasonic sensors, four rear ultrasonic sensors, and two side ultrasonic sensors in past four steps.

Furthermore, when sequential direct and indirect waves and a signal strength, which are obtained from at least one ultrasonic sensor, a behavior (e.g., a speed v, or steering w) of the host vehicle, which is obtained from a wheel speed sensor and a steering sensor, and a distance d and an angle θ from the center of gravity of the host vehicle to each cell on the occupancy grid map are input to a prediction module, a risk of each cell may be output and the result may be output using consecutive input values from the present to the past.

Referring to FIG. 5, when sequential direct and indirect waves and a signal strength, which are obtained from at least one ultrasonic sensor, a behavior (e.g., a speed v, or steering w) of the host vehicle, which is obtained from a wheel speed sensor and a steering sensor, and a distance d and an angle θ from the center of gravity of the host vehicle to each cell on the occupancy grid map are input to a signal delay layer (TDL), and a risk probability may be output as a value of 1 to 2 by applying respective output values of the TDL to an activate function.

The processor 130 may learn values measured during a predetermine time period by at least one ultrasonic sensor by means of a learning algorithm to calculate a risk probability and may update a risk probability of each cell on the occupancy grid map.

The processor 130 may calculate a risk probability $P(m_i|z_{1:t},x_{1:t})$ of each cell by applying a Bayesian rule like Equation 1 below when a risk probability of an initial cell is 0.5. In this case, x and z refer to coordinate values of each cell.

$$P(m_i \mid z_{1:t}, x_{1:t}) = \frac{P(m_i \mid z_t, x_t) \cdot P(z_t \mid x_t) \cdot P(m_i \mid z_{1:t-1}, x_{1:t-1})}{P(m_i) \cdot P(z_t \mid z_{1:t-1}, x_{1:t})} \quad \text{[Equation 1]}$$

Because the risk probability of each cell is a binary random variable, the processor 130 may convert the risk probability of each cell in log notation like Equations 2 and 3 below.

$$l(x) = \log\left(\frac{p(x)}{1-p(x)}\right) \quad \text{[Equation 2]}$$

$$l(m_i \mid z_{1:t}, x_{1:t}) = l(m_i \mid z_t, x_t) + l(m_i \mid z_{1:t-1}, x_{1:t-1}) - l(m_i) \quad \text{[Equation 3]}$$

l(x) is the risk probability by the log notation, and p(x) is the risk probability which is a binary random variable value.

The processor 130 may compare the risk probability of each cell on the occupancy grid map with a predetermined threshold value. When the risk probability of each cell is greater than or equal to the predetermined threshold value, the processor 130 may determine that an obstacle is present on a corresponding cell. As shown in FIG. 4, the processor 130 may determine a cell, the risk probability of which is greater than the threshold value, as a cell on which an obstacle is present and may display only cells on which the obstacle is present in dark color to distinguish the obstacle. As such, the processor 130 may address a problem where a contour of an obstacle of a conventional ultrasonic sensor is expanded by determining whether an obstacle is present for each cell on the occupancy grid map.

As such, the processor 130 may generate an occupancy grid map based on a sensing value of at least one ultrasonic sensor and may calculate a risk probability of each cell on the occupancy grid map, thus determining a shape and location of the obstacle based on the risk probability of each cell.

When the risk probability of the at least one cell on the occupancy grid map is intermittently greater than or equal to a threshold value, the processor 130 may determine that an obstacle located on the corresponding cell is an obstacle which it is possible for the host vehicle to pass. In other words, when a risk probability of a specific one cell, which is calculated first for the cell, is greater than the threshold value, when a risk probability of the cell, which is calculated secondly for the cell, is less than the threshold value, when a risk probability of the cell, which is calculated thirdly for the cell, is greater than the threshold value, and when a risk probability of the cell, which is calculated fourthly for the cell, is less than the threshold value, that is, when the risk probability continues changing for one specific cell, the processor 130 may determine that an obstacle is present, but is an obstacle, such as a curb, having a low height at which the host vehicle does not break. Thus, the processor 130 may distinguish an obstacle which it is possible for the host vehicle to pass, from an obstacle which it is impossible for the host vehicle to pass, thus preventing the host vehicle from braking before the obstacle where it is impossible for the host vehicle to brake.

The processor 130 may calculate a time to collision based on the risk probability of each cell on the occupancy grid map and may determine a braking control time (C.T) like Equation 4 below.

$$C.T = C.T_{const} - \alpha \cdot l(m_i(z_{1:t}, x_{1:t}) \quad \text{[Equation 4]}$$

$T_{const}$ is the braking control time defined as a default time, α is the predetermined constant, and $l(m_i|z_{1:t},x_{1:t})$ is the risk probability by the log notation.

The processor 130 may calculate a time to collision based on a speed v of the host vehicle and may determine a braking control time like Equation 5 below.

$$C.T = C.T_{const} - \beta \cdot v \quad \text{[Equation 5]}$$

The processor 130 may determine a braking control time proportional to the risk probability of each cell on the occupancy grid map or the speed of the host vehicle. Herein, β is the predetermined constant.

Thus, the processor 130 may determine a final braking control time $C.T_{totoal}$ based on the risk probability of each cell and the speed of the host vehicle like Equation 6 below.

[Equation 6]

$$C.T_{total} = C.T_{const} - \alpha \cdot l(m_i|z_{1:t}, x_{1:t}) - \beta \cdot v$$

The sensing device 200 may include one or more sensors, each of which detects an object located around the host vehicle, for example, a preceding vehicle, and measures a distance from the obstacle and/or a relative speed of the obstacle.

The sensing device 200 may have a plurality of sensors for sensing objects outside the host vehicle and may obtain information about a location of the object, a speed of the object, a movement direction of the object, and/or a type (e.g., a vehicle, a pedestrian, a bicycle, a motorcycle, or the like) of the object. To this end, the sensing device 200 may include a plurality of ultrasonic sensors, a wheel speed sensor, a steering sensor, or the like. As shown in FIG. 3, the sensing device 200 may include one or more front ultrasonic sensors 201, one or more side ultrasonic sensors 202, and one or more rear ultrasonic sensors 203.

An embodiment of the present disclosure may discover a parking space using such ultrasonic sensors and may obtain information about an approaching obstacle or the like.

The interface 300 may include an input means for receiving a control command from a user and an output means for outputting an operation state, an operation result, or the like of the obstacle recognition device 100. The interface 300 may be implemented as a human machine interface (HMI) such as reference numeral 301 of FIG. 3.

Herein, the input means may include a key button and may further include a mouse, a joystick, a jog shuttle, a stylus pen, or the like. Furthermore, the input means may further include a soft key implemented on a display.

The output means may include the display and may further include a voice output means such as a speaker. In this case, a touch sensor such as a touch film, a touch sheet, or a touch pad is provided in the display, the display operates as a touchscreen and may be implemented in a form where the input means and the output means are integrated with each other. As an example, the output means may display a parking space, obstacle information, or the like.

In this case, the display may be implemented as a head-up display (HUD), a cluster, an audio video navigation (AVN), a human machine interface (HMI), or the like. Furthermore, the display may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and/or a three-dimensional (3D) display. Some thereof may be implemented as transparent displays configured as a transparent type or a semi-transparent type to see the outside. Moreover, the display may be implemented as a touchscreen including a touch panel to be used as an input device other than an output device.

The steering controller 400 may be configured to control a steering angle of the host vehicle and may include a steering wheel, an actuator interlocked with the steering wheel, and a controller for controlling the actuator.

The braking controller 500 may be configured to control braking of the host vehicle and may include a controller for controlling a brake. As shown in FIG. 3, the braking controller 500 may include an electronic stability control (ESC) 501 for braking control.

The engine controller 600 may be configured to control to drive an engine of the host vehicle and may include a controller for controlling a speed of the host vehicle.

As such, an embodiment of the present disclosure may learn a trend of data (e.g., a combination of a direct wave and an indirect wave, a relationship between the direct wave and a signal strength), which is indicated when an obstacle is recognized, using the direct wave, the indirect wave, the signal strength value among output values of the ultrasonic sensor and may estimate a shape of the obstacle, thus solving the uppermost limit of the ultrasonic sensor and preventing incorrect braking.

Figure 7:
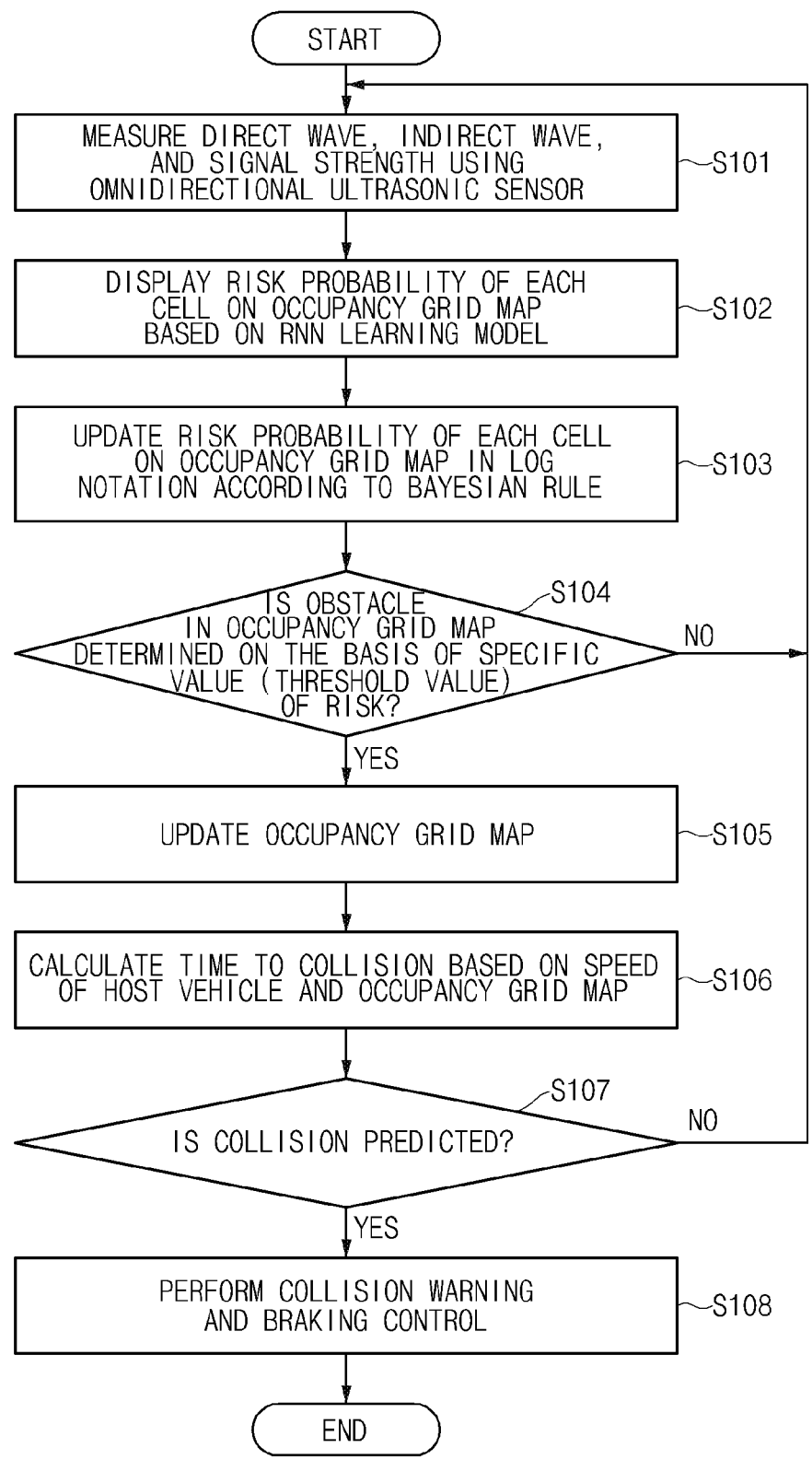
FIG. 7 is a flowchart illustrating a method for recognizing an obstacle based on obstacle estimation according to an embodiment of the present disclosure.

Hereinafter, a description will be given in detail of an obstacle recognition method according to an embodiment of the present disclosure with reference to FIG. 7. FIG. 7 is a flowchart illustrating a method for recognizing an obstacle based on obstacle estimation according to an embodiment of the present disclosure.

Hereinafter, it is assumed that an obstacle recognition device 100 of FIG. 1 performs a process of FIG. 7. Furthermore, in a description of FIG. 7, an operation described as being performed by an apparatus may be understood as being controlled by a processor 130 of the obstacle recognition device 100.

Referring to FIG. 7, in S101, the apparatus may measure a direct wave, an indirect wave, and a signal strength using an omnidirectional ultrasonic sensor. In this case, the apparatus may accumulate a measurement value by an accumulation step of an RNN learning model. In this case, because it is unable for the apparatus to accurately know a real location and shape of an obstacle when detecting the obstacle using a single ultrasonic sensor, the apparatus may apply an RNN model for estimating a location and shape of the obstacle based on a plurality of ultrasonic sensors.

In S102, the apparatus may display a risk probability of each cell on an occupancy grid map based on the RNN learning model.

In other words, the apparatus may output a risk of each cell on the occupancy grid map using repeated characteristic output values which are output by inputting an input value (e.g., a direct wave, an indirect wave, and a signal strength of an ultrasonic sensor, a behavior of the host vehicle, a distance and angle from the center of gravity of the host vehicle to each cell on the occupancy grid map, or the like) to the RNN learning model. In this case, the apparatus may apply a weight to the RNN learning model.

The apparatus may output the risk probability of each cell by applying a Bayesian rule based on the risk of each cell on the occupancy grid map based on the RNN learning model. For example, when there is an obstacle, the risk probability may be output as "1". When there is no obstacle, the risk probability may be output as "0".

Because the risk probability of each cell is a binary random variable value, in S103, the apparatus may update the risk probability of each cell on each occupancy grid map in log notation.

In S104, the apparatus may determine whether the risk probability value of each cell, which is calculated in log notation, is greater than or equal to a threshold value and may determine that an obstacle is present on a corresponding cell of the occupancy grid map when the risk probability value is greater than the threshold value.

When the obstacle is present on the cell of the occupancy grid map, in S105, the apparatus may update the occupancy grid map to an occupancy grid map on which the obstacle is present. In this case, when a risk probability of a specific cell first output is greater than a threshold value, but when a risk probability of a specific cell secondly output is less than the threshold value, that is, when the risk probability becomes repeatedly high and low, an obstacle does not detected successively. Thus, there is a high probability that there will be an obstacle, such as a curb or a speed bump, having a low height or that there will be no obstacle because the vehicle moves. Thus, because the obstacle, such as the curb or the speed bump, having the low height is not high successively in risk probability, the apparatus may fail to recognize the obstacle as an obstacle. Because there is no obstacle on a current cell after the vehicle already moves, the apparatus may prevent the length of the obstacle from being expanded and recognized while the vehicle is traveling.

In S106, the apparatus may calculate a time to collision between the host vehicle and the obstacle based on a speed of the host vehicle and the occupancy grid map. In S107, the apparatus may determine whether the host vehicle is expected to collide with the obstacle on a corresponding cell. When the host vehicle is not expected to collide with the obstacle, the apparatus may control the host vehicle to continue traveling.

When the apparatus determines that the host vehicle is expected to collide with the obstacle on a corresponding cell, the apparatus may determine a braking control time for collision avoidance using the risk probability of the occupancy grid map and the speed of the host vehicle, and in this case, the apparatus may determine a braking control time attenuated in proportion to a magnitude of a probability value of each cell on the occupancy grid map or the speed of the host vehicle. In S108, the apparatus may perform collision warning and braking control.

When the host vehicle is not expected to collide with the obstacle, the apparatus may control the host vehicle to continue traveling, such that braking control is not performed due to the obstacle such as a curb or a speed bump.

Figure 8:
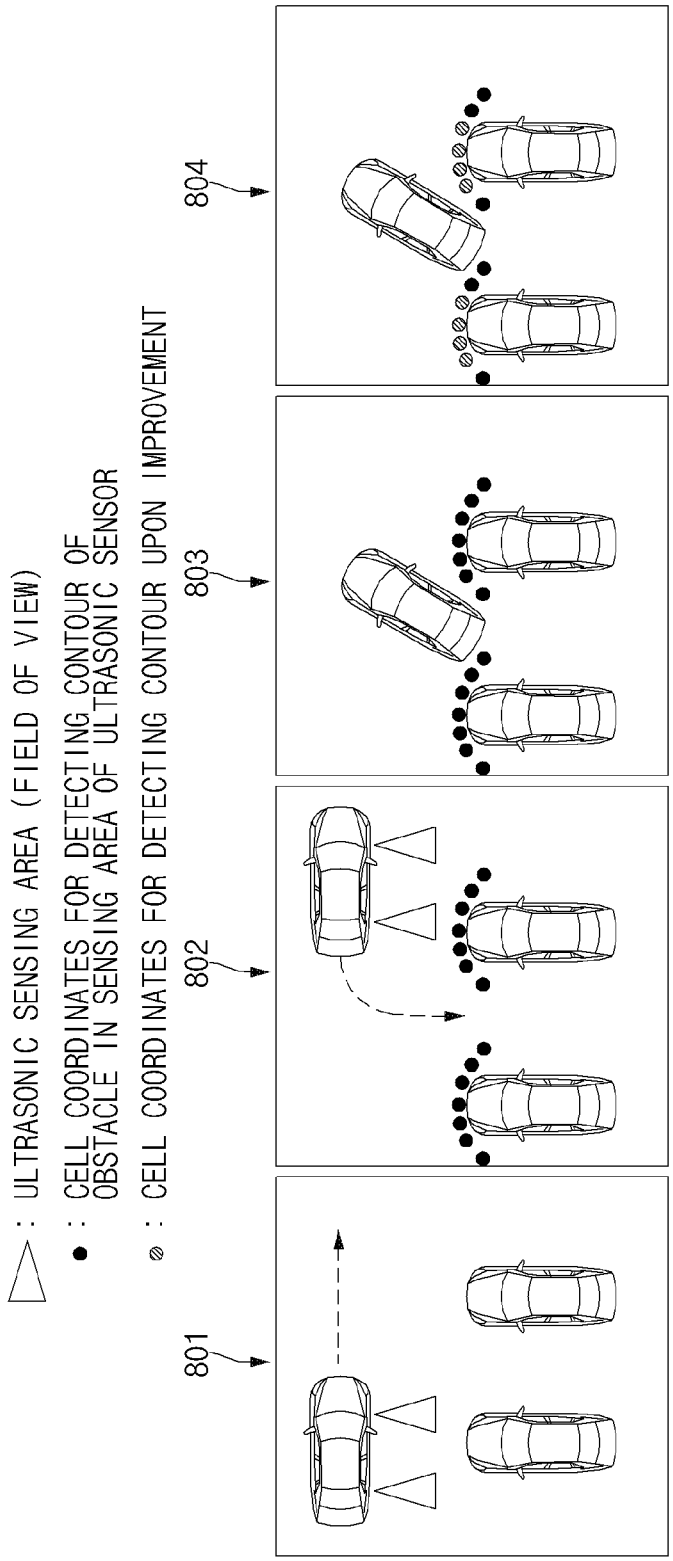
FIG. 8 is a drawing illustrating an exemplary screen of attempting to park between two parked vehicles according to an embodiment of the present disclosure.

FIG. 8 is a drawing illustrating an exemplary screen of attempting to park between two parked vehicles according to an embodiment of the present disclosure.

Referring to reference numeral 801 of FIG. 8, when a host vehicle detects a parking space between two parked vehicles by applying a vertical detection scheme of an ultrasonic sensor based on a direct wave or an indirect wave of the ultrasonic sensor like reference numeral 802 while a host vehicle is traveling at a low speed to park, a contour of an obstacle may be expanded and recognized like reference numeral 803 such that the parking space between the two vehicles may be narrowly recognized. Thus, in an existing technology, although it is possible to park in a parking space between two vehicles in a situation such as reference numeral 803, it is impossible to perform parking control. Thus, like reference numeral 804, an embodiment of the present disclosure may calculate a risk probability of each cell based on the occupancy grid map to determine whether there is an obstacle depending on the probability, thus accurately determining a shape and location of the obstacle. Thus, as a parking space is sufficiently recognized in a situation such as reference numeral 804, it is possible to perform parking control.

Figure 9:
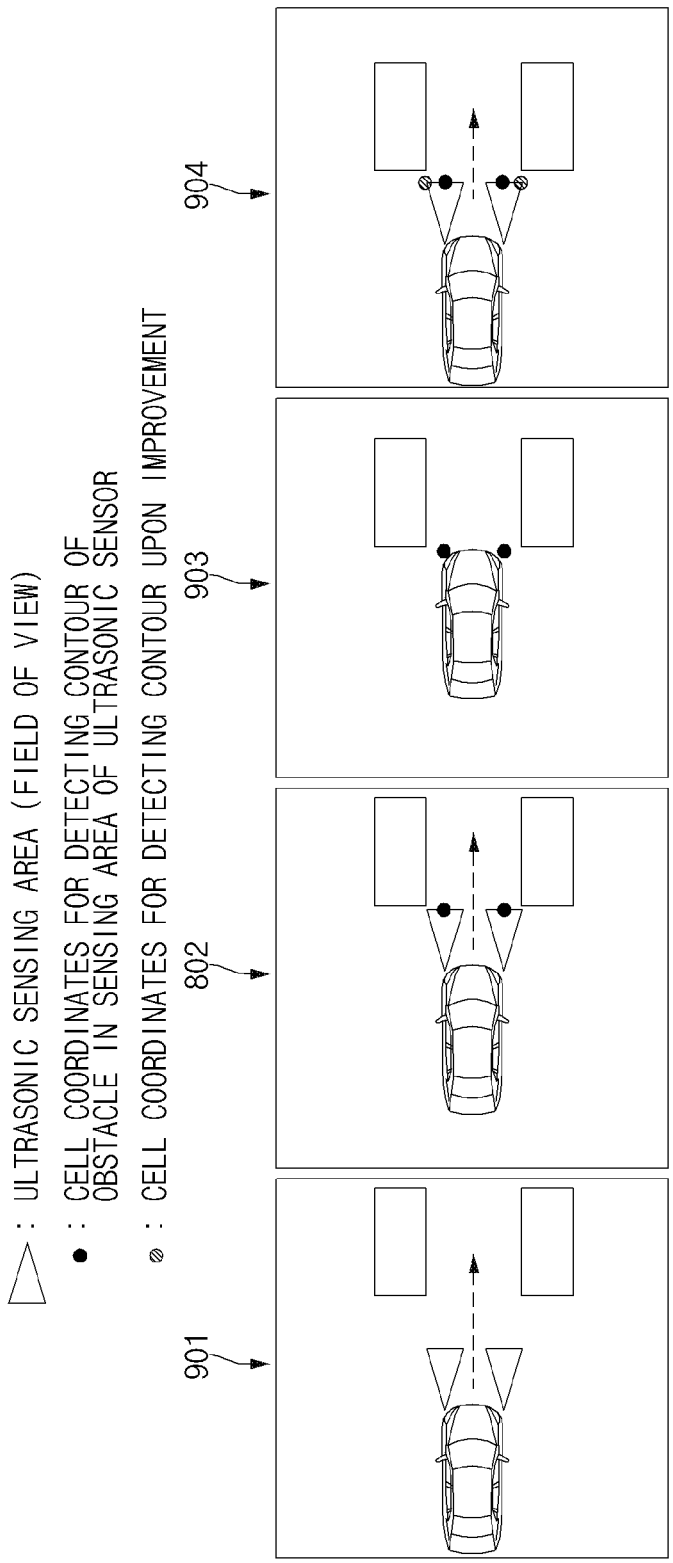
FIG. 9 is a drawing illustrating an exemplary screen of passing through a narrow passage according to an embodiment of the present disclosure.

FIG. 9 is a drawing illustrating an exemplary screen of passing through a narrow passage according to an embodiment of the present disclosure.

Referring to reference numeral 901 of FIG. 9, when a host vehicle passes through a narrow passage between two obstacles while traveling at a low speed, like reference numeral 902, a conventional ultrasonic sensor expands and recognizes contours of the obstacles such that the passage is more narrowly recognized. Thus, like reference numeral 903, although it is possible for the host vehicle to pass through the passage, pass control is not performed. Thus, like reference numeral 904, an embodiment of the present disclosure may calculate a risk probability of each cell based on the occupancy grid map and may determine whether there is an obstacle depending on the probability to accurately detect a shape and location of the obstacle. Thus, it is possible to perform driving control to a corresponding passage.

Figure 10:
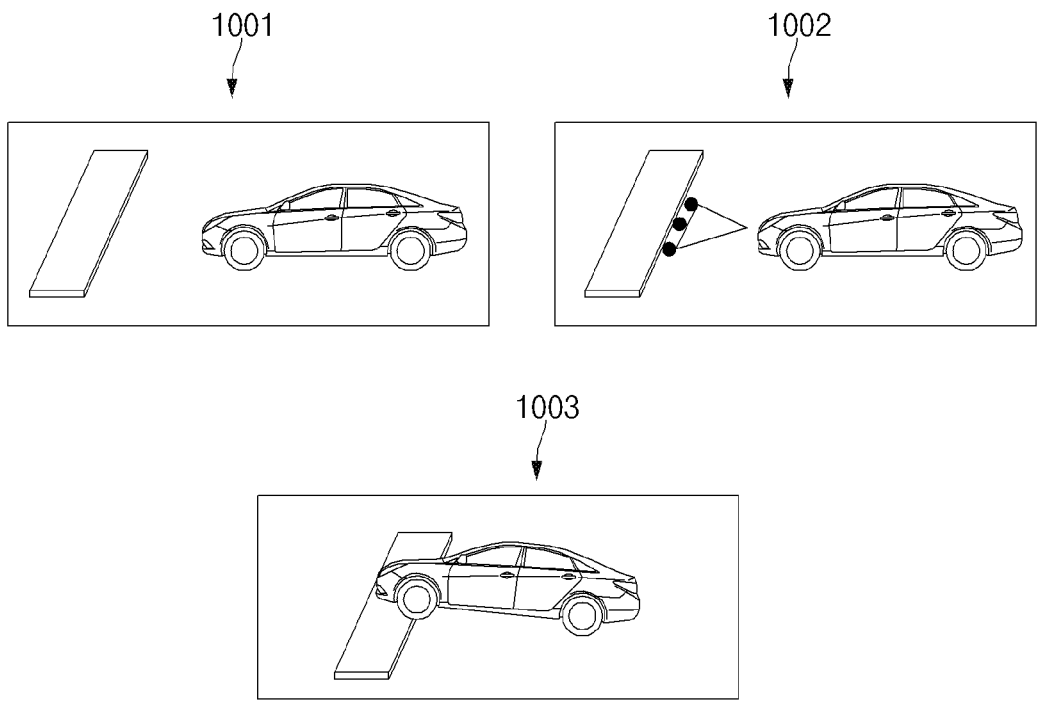
FIG. 10 is a drawing illustrating an exemplary screen of approaching an obstacle such as a curb according to an embodiment of the present disclosure.

FIG. 10 is a drawing illustrating an exemplary screen of approaching an obstacle such as a curb according to an embodiment of the present disclosure.

Like reference numeral 1001 of FIG. 10, when there is an obstacle such as a curb in front of a host vehicle while the host vehicle is traveling, like reference numeral 1002, an existing ultrasonic sensor may recognize the curb as an obstacle, which it is impossible for the host vehicle to pass, such that the host vehicle performs braking control. However, like reference numeral 1003, an embodiment of the present disclosure may determine the curb as an obstacle, which it is possible for the host vehicle to pass, using a signal strength, and may make it possible for the host vehicle to drive without incorrect braking.

As such, an embodiment of the present disclosure may accurately estimate shapes and locations of obstacles located in all the directions of the vehicle using an ultrasonic sensor previously mounted on the vehicle to assist the host vehicle to prevent collision while the vehicle is traveling at a low speed. Furthermore, an embodiment of the present disclosure may more accurately estimate a shape and location of an obstacle based on an ultrasonic sensor to minimize incorrect braking.

Figure 11:
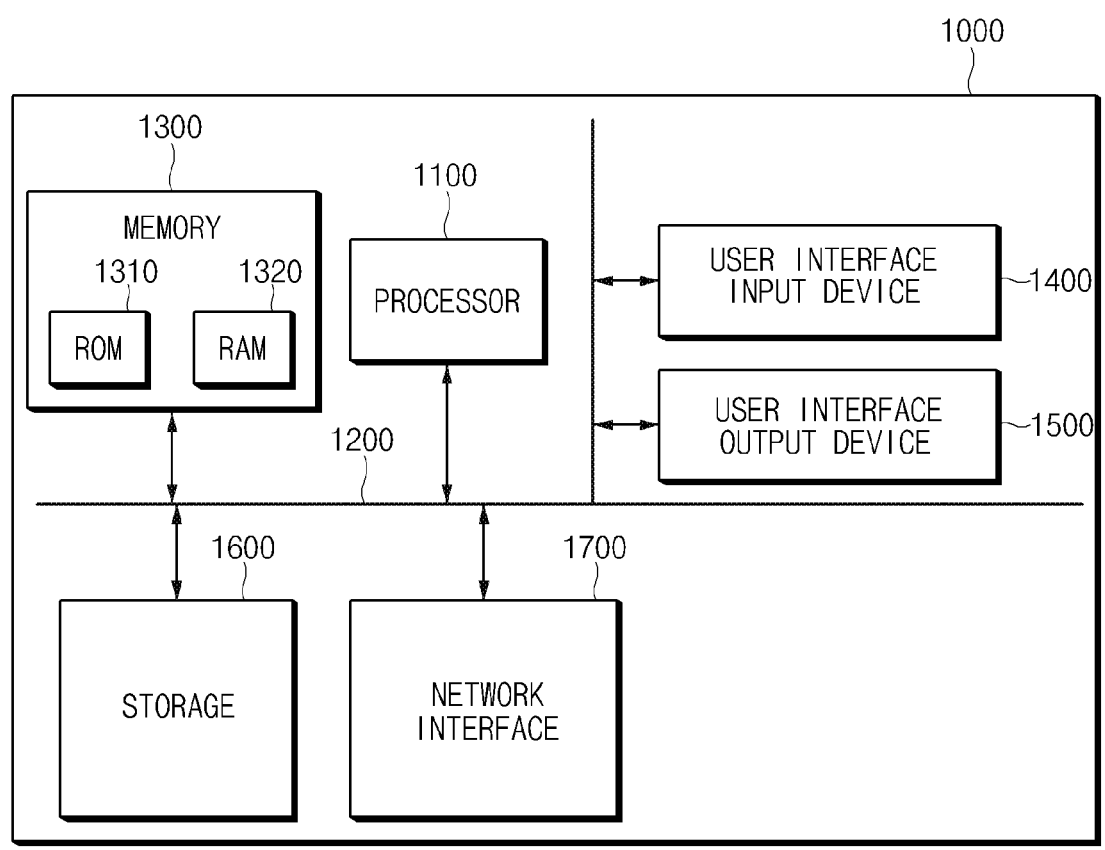
FIG. 11 is a block diagram illustrating a computing system according to an embodiment of the present disclosure.

FIG. 11 is a block diagram illustrating a computing system according to an embodiment of the present disclosure.

Referring to FIG. 11, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may accurately estimate a shape of an obstacle based on a learning algorithm using a direct wave, an indirect wave, and a signal strength value among output values of an ultrasonic sensor during low-speed driving control or parking control of the vehicle, thus improving accuracy of collision-avoidance assist control and minimizing incorrect braking.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An obstacle recognition device, comprising:
    a storage storing data and an algorithm for calculating a risk probability; and
    a processor configured to execute the algorithm to generate an occupancy grid map based on a sensing value of at least one ultrasonic sensor, calculate the risk probability of each cell on the occupancy grid map, and determine a shape and location of an obstacle based on the risk probability of each cell,
    wherein the processor is configured to determine that an obstacle located on a corresponding cell is an obstacle for a vehicle to pass, when a risk probability of at least one cell on the occupancy grid map is greater than or equal to a predetermined threshold value, and
    the processor converts the risk probability of each cell, calculated by a Bayesian rule, in log notation.

2. The obstacle recognition device of claim 1, wherein the processor obtains sequential direct and indirect waves and a signal strength from the at least one ultrasonic sensor.

3. The obstacle recognition device of claim 2, wherein the processor calculates the risk probability of each cell on the occupancy grid map by using the direct wave, the indirect wave, and the signal strength of the at least one ultrasonic sensor, a behavior of the vehicle, and a distance and an angle from a center of gravity of the vehicle to each cell on the occupancy grid map as input values of a learning algorithm.

4. The obstacle recognition device of claim 3, wherein the processor performs the learning algorithm using a recurrent neural network (RNN) learning model.

5. The obstacle recognition device of claim 1, wherein the processor updates the risk probability of each cell using the Bayesian rule.

6. The obstacle recognition device of claim 1, wherein the processor compares the risk probability of each cell, converted in the log notation, with the threshold value.

7. The obstacle recognition device of claim 6, wherein the processor determines that an obstacle which it is impossible for the vehicle to pass is present on a corresponding cell when the risk probability of each cell is greater than or equal to the threshold value and updates the occupancy grid map.

8. The obstacle recognition device of claim 1, wherein the processor determines a break regulation time by calculating a time to collision based on the risk probability of each cell on the occupancy grid map and a speed of the vehicle.

9. The obstacle recognition device of claim 1, wherein the processor determines a braking control time proportional to the risk probability of each cell on the occupancy grid map or a speed of the vehicle.

10. A vehicle system, comprising:
a sensing device including at least one ultrasonic sensor; and
an obstacle recognition device configured to generate an occupancy grid map based on a sensing value of the at least one ultrasonic sensor, calculate a risk probability of each cell on the occupancy grid map, and determine a shape and location of an obstacle based on the risk probability of each cell,
wherein the obstacle recognition device is configured to determine that an obstacle located on a corresponding cell is an obstacle for a vehicle to pass, when a risk probability of at least one cell on the occupancy grid map is greater than or equal to a threshold value, and convert the risk probability of each cell, calculated by a Bayesian rule, in log notation.

11. The vehicle system of claim 10, wherein the obstacle recognition device determines a break regulation time by calculating a time to collision based on the risk probability of each cell on the occupancy grid map and a speed of the vehicle.

12. The vehicle system of claim 11, further comprising:
a braking controller configured to perform braking control depending to the braking control time.

13. An obstacle recognition method, comprising:
generating an occupancy grid map based on a sensing value of at least one ultrasonic sensor;
calculating a risk probability of each cell on the occupancy grid map;
determining a shape and location of an obstacle based on the risk probability of each cell; and
determining that an obstacle located on a corresponding cell is an obstacle for a vehicle to pass, when a risk probability of at least one cell on the occupancy grid map is greater than or equal to a threshold value,
wherein the calculating of the risk probability of each cell includes: converting the risk probability of each cell, calculated by a Bayesian rule, in log notation.

14. The obstacle recognition method of claim 13, wherein the calculating of the risk probability of each cell includes:
calculating the risk probability of each cell on the occupancy grid map by using a direct wave, an indirect wave, and a signal strength of the at least one ultrasonic sensor, a behavior of the vehicle, and a distance and an angle from a center of gravity of the vehicle to each cell on the occupancy grid map as input values of a learning algorithm.

15. The obstacle recognition method of claim 13, wherein the calculating of the risk probability of each cell includes:
updating the risk probability of each cell by calculating the risk probability of each cell using the Bayesian rule.

16. The obstacle recognition method of claim 13, further comprising:
determining whether there is the obstacle which it is impossible for the vehicle to pass, by comparing the risk probability of each cell on the occupancy grid map with the threshold value.

17. The obstacle recognition method of claim 16, further comprising:
determining that the obstacle is present on a corresponding cell when the probability of each cell is greater than or equal to the threshold value.

* * * * *